United States Patent Office 3,375,296
Patented Mar. 26, 1968

3,375,296
CONVERSION OF ETHYLENE TO HIGHER 1-OLEFINS
Robert E. Reusser, Bartlesville, Okla., assignor to Phillips Petroleum Company, a corporation of Delaware
No Drawing. Filed Apr. 28, 1965, Ser. No. 451,621
11 Claims. (Cl. 260—683.15)

ABSTRACT OF THE DISCLOSURE

Ethylene is converted to higher 1-olefins using a catalyst formed on mixing chromium halide and an organolithium compound.

---

This invention relates to a method for converting ethylene to higher molecular weight hydrocarbons.

Heretofore, it has been suggested that certain metal salts together with certain organoalkali metal compounds could be used to convert olefins into solid polymers.

Quite surprisingly, it has now been found that ethylene can be converted to higher molecular weight 1-olefins by contacting same with a catalyst formed on mixing chromium halide and an organolithium compound.

Accordingly, it is an object of this invention to provide a new and improved method for the conversion of ethylene to higher hydrocarbons.

Other aspects, objects and the several advantages of the invention will be apparent to those skilled in the art from the description and the appended claims.

According to this invention ethylene is converted to higher 1-olefins, i.e., olefins containing from 4 to 10, preferably from 4 to 6 carbon atoms per mole, inclusive, by contacting same per se or in the presence of a diluent with a catalyst formed on admixing a chromium halide, preferably chromic halide, and an organolithium compound.

The catalyst of this invention comprises a mixture of chromium halide, preferably chromic halide, and an organolithium compound.

The organolithium compounds of this invention are represented by the formual $RLi_n$ wherein R is selected from the group consisting of alkyl, aryl, cycloalkyl, and combinations thereof such as alkaryl and aralkyl containing from 1 to 20 carbon atoms (3 to 20 in the case of cyclic hydrocarbons and 6 to 20 in the case of aromatic hydrocarbons) and $n$ is an integer from 1 to 3, preferably 1. R is preferably selected from the group consisting of alkyl, cycloalkyl and combinations thereof containing from 4 to 14 carbon atoms. When $n$ is 1, R is preferably 1 to 8, still more preferably 2 to 6, carbon atoms. Some specific examples of compounds of the formula $RLi_n$ are methyllithium,
ethyllithium,
isopropyllithium,
n-butyllithium,
tert-butyllithium,
n-hexyllithium,
n-octyllithium,
n-dodecyllithium,
n-eicosyllithium,
phenyllithium,
benzyllithium,
4-ethylphenyllithium,
2-phenylethyllithium,
cyclohexyllithium,
2-ethylcyclohexyllithium,
cyclooctyllithium,
cyclododecyllithium,
1,4-dilithiobutane,
1,6-dilithiohexane,
1,10-dilithiodecane,
1,20-dilithioeicosane,
1,4-dilithio-2-methyl-2-butene,
1,4-dilithio-2-butene,
dilithionaphthalene,
dilithiomethylnaphthalene,
4,4'-dilithiobiphenyl,
dilithioanthracene,
1,4-dilithio-1,1-diphenylethane,
1,2-dilithio-1,2-diphenylethane,
1,2-dilithiotetraphenylethane,
1,2,-dilithio-1-phenyl-1-naphthylethane,
1,2-dilithio-1,2-dinaphthylethane,
1,2-dilithiotrinaphthylethane,
1,4-dilithiocyclohexane,
1,3,5-trilithiocyclohexane,
1-lithio-4-(2-lithioethylphenyl)butane,
1,2-di(lithiobutyl)benzene,
1,3-dilithio-4-ethylbenzene,
1,5,12-trilithiododecane,
1,5-dilithio-3-pentyne,
dilithiophenanthrene,
dilithiomethane, and the like.

The chromic halide compounds of this invention are represented by the formula $CrX_3$ where X is a halogen and is preferably at least one halide selected from the group consisting of chlorine, bromine and iodine. Specific examples of these compounds include chromic chloride, chromic bromide, chromic iodide and the like.

Specific catalyst systems that are preferably employed in this invention include chromic chloride-n-butyllithium, chromic bromide-n-butyllithium, chromic iodide-n-butyllithium, chromic chloride-tert-butyllithium, chromic bromide-tert-butyllithium, chromic chloride - 1,2 - dithio-1,2-diphenylethane, chromic bromide - 1,2 - dilithio - 1,2-diphenylethane, chromic chloride-dilithionaphthalene, and chromic bromide-dilithionaphthalene.

The active catalyst of this invention is obtained by mixing or otherwise contacting the organolithium compound with a chromium halide compound at a temperature of at least about 0° C. Generally, the temperature of contacting can range from about 0 to about 150° C., or higher if desired, preferably from about 25 to about 100° C. The period of time during which these two catalyst components are contacted can vary over a wide operable range but will generally vary from about two minutes to about three days, preferably from about 0.5 to about 5 hours.

The above two catalyst components can be mixed without the presence of a diluent, but a diluent can be employed and if so can be at least one compound selected from the group consisting of paraffins, cycloparaffins and aromatics, each having from 5 to 12, preferably from 6 to 10, carbon atoms per molecule. Such diluents include benzene n-hexane, cyclohexane, n-pentane, isooctane, naphtha, Decalin, naphthalene, n-dodecane, and the like and mixtures thereof.

The catalyst obtained by the mixing of the two catalyst components is then contacted with ethylene in the presence or absence of an inert diluent, preferably in the presence of such a diluent. The diluent employed can be chosen from the same materials utilized as a diluent during the contacting of the two catalyst components and is preferably the same diluent used during this contacting.

The mole ratio of the organolithium compound to the chromium halide compound can vary over a wide range but will generally be from about 0.5/1 to about 10/1, preferably from 2/1 to about 5/1. The total amount of catalyst employed to convert the ethylene can also vary over a wide operable range and when no diluent is present will vary greatly depending upon actual conditions of pressure and the like but will generally be from about 0.1 to about 10 weight percent based on the ethylene. A primary requirement relative to the amount of catalyst present is that an effective catalytic amount is present and this amount can be readily determined by one skilled in the art. If a diluent is employed the amount of catalyst present can still vary over a wide operable range but will generally be in the range of from about 0.5 to about 20 weight percent of the diluent present.

The contacting of the ethylene with the catalyst can be carried out at elevated temperatures, preferably at least 175° C., still more preferably in the range of from about 180 to about 350° C. The pressure can vary over a wide operable range but will generally fall within the range of from about 100 to about 5000 p.s.i.g. depending upon the reaction temperature. Reaction times will generally range from about two minutes to three days but will generally be from about 1 to about 10 hours.

The process of this invention is amenable to batchwise as well as continuous processes and the separation of a higher 1-olefin product can be effected by known means such as distillation, crystallization, and the like.

The 1-olefin products of this invention can be used as intermediates in the preparation of long-chain alkylamines and the like. The products can also be used in the alkylation of aromatics such as benzene to form alkylated aromatics suitable for sulfonation to form surfactants.

EXAMPLE

Benzene in the amount of 270 milliliters was charged to a 1,000-milliliter autoclave after which 3.45 grams of chromic chloride was added under an inert atmosphere of nitrogen. The reactor was sealed and 50 milliliters of a 1.6 molar n-hexane solution of n-butyllithium was charged thereinto. The reactor was then heated at 80° C. for 2 hours, after which it was cooled to 25° C.

After the reactor had cooled to 25° C., 5 milliliters of hexene-1 was charged to the reactor for subsequent use as a chromatographic analysis aid. An additional 20 milliliters of benezene diluent was added and then ethylene was pressured into the reactor until a pressure of 700 p.s.i.g. was obtained, after which the reactor was heated to 190° C. At 190° C. it appeared by the drop in pressure in the reactor that ethylene was being consumed. Heating was continued, raising the temperature to 200° C., which temperature was maintained for 2 hours during which time the pressure dropped from 1550 p.s.i.g. to 1120 p.s.i.g. Most of the pressure drop occurred during the first hour of reaction after which the pressure leveled off at about 1120 p.s.i.g. The reactor was then cooled, opened and a gas-liquid chromatographic analysis (GLC) of the liquid product therein was conducted. The GLC analysis was carried out on a 20-foot polypheneyl ether column and indicated that 49 grams of butenes were present as well as 39 grams of hexene-1 over and above the 5 milliliters charged as a chromatographic analysis aid were present.

Thus, it can be seen from the above example that the catalyst formed on mixing chromic chloride and n-butyllithium was significantly effective for the conversion of ethylene to higher olefins, principally butenes and hexenes.

Reasonable variations and modifications are possible within the scope of this disclosure without departing from the spirit and scope thereof.

I claim:

1. A method for converting ethylene to higher 1-olefins containing 4–10 carbon atoms per molecule comprising contacting ethylene with a catalyst consisting essentially of that formed on mixing at a temperature of at least about 0° C. chromic halide and an organolithium compound represented by the formula $RLi_n$ wherein R is selected from the group consisting of alkyl, aryl, cycloalkyl, and combinations thereof containing from 1 to 20 carbon atoms and $n$ is an integer from 1 to 3.

2. The method according to claim 1 wherein the halide is selected from the group consisting of chlorine, bromine and iodine.

3. The method according to claim 1 wherein said diluent is n-hexane and the contacting temperature is at least 175° C.

4. The method according to claim 1 wherein said hydrocarbon diluent is cyclohexane and said contacting temperature is at least 175° C.

5. A method for converting ethylene to higher 1-olefins containing 4–10 carbon atoms per molecule comprising contacting ethylene with a catalytic amount of a catalyst consisting essentially of that formed on mixing at a temperature of at least about 0° C. chromic halide and an organolithium compound represented by the formula RLi wherein R is selected from the group consisting of alkyl, aryl, cycloalkyl, and combinations thereof containing from 1 to 8 carbon atoms in the presence of a hydrocarbon diluent.

6. The method according to claim 5 wherein said contacting of said catalyst with ethylene is carried out at a temperature of at least 175° C.

7. A method for converting ethylene to higher 1-olefins containing 4–10 carbon atoms per molecule comprising contacting at a temperature of at least 175° C. and in the presence of a hydrocarbon diluent selected from the group consising of paraffins, cycloparaffins and aromatics having from 5 to 12 carbon atoms per molecule, ethylene and a catalyst consisting essentially of that formed on mixing chromic halide with an organolithium compound represented by the formula RLi wherein R is selected from the group consisting of alkyl, cycloalkyl and combinations thereof containing from 2 to 6 carbon atoms, said mixing being carried out at a temperature of from about 0 to about 150° C., and said catalyst being present in an amount of from 0.5 to about 20 weight percent based on the diluent present.

8. A method for converting ethylene to higher 1-olefins containing from 4 to 10 carbon atoms per molecule comprising contacting ethylene with an effective amount of a catalyst consisting essentially of that formed on admixing at a temperature of at least about 0° C. chromic chloride and n-butyllithium, said contacting and said admixing being carried out in the present of a hydrocarbon diluent.

9. The method according to claim 8 wherein said diluent is benzene and said contacting is carried out at a temperature of at least 175° C.

10. A method for converting ethylene to higher 1-olefins containing from 4 to 10 carbon atoms per molecule comprising contacting ethylene with an effective amount of a catalyst consisting essentially of that formed on reacting at a temperature of at least about 0° C. chromic bromide and n-butyllithium, said contacting and said reacting being carried out in the presence of a hydrocarbon diluent.

11. A method for converting ethylene to higher 1-olefins containing from 4 to 10 carbon atoms per molecule comprising contacting ethylene with an effective amount of a catalyst consisting essentially of that formed on reacting at a temperature of at least about 0° C. chromic iodide and n-butyllithium, said contacting and said reacting being carried out in the presence of a hydrocarbon diluent.

References Cited

UNITED STATES PATENTS

| | | | |
|---|---|---|---|
| 3,047,513 | 7/1962 | Gresham et al. | 254—429 |
| 3,054,788 | 9/1962 | D'Alelio | 260—94.9 X |
| 3,085,120 | 4/1963 | Seyferth et al. | 260—94.2 X |
| 3,179,648 | 4/1965 | Casale et al. | 260—94.9 |
| 3,231,515 | 1/1966 | Ziegler et al. | 252—429 |
| 3,257,371 | 6/1966 | Maurer | 252—429 X |

PAUL M. COUGHLAN, Jr., *Primary Examiner.*